(12) United States Patent
Tetzlaff et al.

(10) Patent No.: US 8,684,679 B2
(45) Date of Patent: Apr. 1, 2014

(54) ABRASION RESISTANCE IN WELL FLUID WETTED ASSEMBLIES

(71) Applicant: Summit ESP, LLC, Tulsa, OK (US)

(72) Inventors: Steven Keith Tetzlaff, Owasso, OK (US); Freddie George Walton, Midland, TX (US); David Thomas Jolly, Midland, TX (US); Shiv Jayaram, Houston, TX (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 13/777,870

(22) Filed: Feb. 26, 2013

(65) Prior Publication Data

US 2013/0315517 A1 Nov. 28, 2013

Related U.S. Application Data

(60) Provisional application No. 61/650,030, filed on May 22, 2012.

(51) Int. Cl.
*F01D 25/16* (2006.01)

(52) U.S. Cl.
USPC ........................................ 415/170.1; 415/229

(58) Field of Classification Search
USPC .................... 415/229, 104, 110, 111; 416/174
See application file for complete search history.

(56) References Cited

U.S. PATENT DOCUMENTS

| | | | |
|---|---|---|---|
| 3,842,192 A | 10/1974 | Hilker et al. | |
| 4,515,993 A | 5/1985 | MacKenzie | |
| 5,160,240 A * | 11/1992 | Wilson | 415/170.1 |
| 5,326,935 A | 7/1994 | Yamaguchi et al. | |
| 5,362,925 A | 11/1994 | Yamaguchi et al. | |
| 5,845,709 A | 12/1998 | Mack et al. | |
| 5,861,578 A | 1/1999 | Hake et al. | |
| 5,917,155 A | 6/1999 | Hake et al. | |
| 6,017,184 A * | 1/2000 | Aguilar et al. | 415/112 |
| 6,056,995 A | 5/2000 | Hake et al. | |
| 6,288,342 B1 | 9/2001 | Ueoka et al. | |
| 6,319,604 B1 | 11/2001 | Xu | |
| 6,547,514 B2 | 4/2003 | Lee | |
| 6,676,366 B2 | 1/2004 | Kao | |
| 7,575,413 B2 * | 8/2009 | Semple et al. | 415/107 |
| 8,070,426 B2 | 12/2011 | Brunner et al. | |
| 2010/0101828 A1 | 4/2010 | Duarte Pena et al. | |
| 2010/0181094 A1 | 7/2010 | Duarte Pena | |
| 2011/0192632 A1 | 8/2011 | Abe et al. | |

FOREIGN PATENT DOCUMENTS

EP 0040034 A1 11/1981

OTHER PUBLICATIONS

Nowacki, J., et al., "Microstructure and characteristics of high dimension brazed joints of cermets and steel," Journal of Achievements in Materials and Manufacturing Engineering, Dec. 2009, 10 pages.

* cited by examiner

*Primary Examiner* — Richard Edgar
(74) *Attorney, Agent, or Firm* — Frederic Dorwart, Lawyers; Penina Michlin Chiu

(57) ABSTRACT

Enhanced abrasion resistance in well fluid wetted assemblies is described. The bearing set of the invention provides an enhanced abrasion resistance that is better capable of withstanding friction from solids in electric submersible pump (ESP) well production applications. The flutes, grooves, sectors and intersections of the invention provide improved fluid and solid flow through assembly components, which improves cooling while the assembly is in operation and reduces body wear, thereby increasing the lifespan of the ESP system.

14 Claims, 4 Drawing Sheets

ABRASION RESISTANCE IN WELL FLUID WETTED ASSEMBLIES

CROSS REFERENCE TO RELATED APPLICATIONS

This application claims the benefit of U.S. Provisional Application No. 61/650,030 to Tetzlaff et al., filed May 22, 2012 and entitled "ABRASION RESISTANCE IN WELL FLUID WETTED ASSEMBLIES," which is hereby incorporated by reference in its entirety.

BACKGROUND OF THE INVENTION

1. Field of the Invention

Embodiments of the invention described herein pertain to the field of well fluid wetted assemblies. More particularly, but not by way of limitation, one or more embodiments of the invention enable abrasion resistance in well fluid wetted assemblies.

2. Description of the Related Art

Fluids containing hydrocarbons, such as oil and natural gas, are often located in underground formations. In such situations, the oil or gas must be pumped to the surface so that it can be collected, separated, refined and sold. Many of these underground formations also contain well born solids, such as consolidated and unconsolidated sand. The hydrocarbon laden fluids must pass through the sand on their way to the pump intake, and ultimately to the surface. When this occurs, the hydrocarbon fluids carry the sand through pump components. Such well-born solids may have severe abrasive effects on the submersible pump components and increase the heat generated during use, since abrasive wear to the pump causes inefficiency in its operation. As a result, careful attention to fluid and pressure management in submersible pump systems is needed in order to improve the production of hydrocarbon laden fluids from subsurface formations.

Currently available submersible pump systems are not appropriate for some well applications. Particularly, pump components used in oil or gas production applications should be exceptionally resistant to erosive wear. When a pump is used in an oil or gas well, equipment failure is especially costly as this can impede well production and replacing parts is undesirable since the equipment is deep in the ground. Care must be taken in cooling the pump equipment and avoiding the damage caused by abrasive materials in the produced well fluid.

In the case of an electric submersible pump (ESP), a failure of the pump or any support components in the pump assembly can be catastrophic as it means a delay in well production and having to remove the pump from the well for repairs. Downhole applications in particular require that ESP pumps be able to survive constant exposure to abrasive materials in the well fluid as well as the heat generated when the pump is in operation. A submersible pump system with improved thrust handling and radial support capabilities, such as an improved ability to withstand abrasion and heat, would be an advantage in all types of submersible and non-submersible assemblies.

Currently available pump assemblies contain bearing surfaces. FIGS. 1A-1C illustrate an example of a "Mixed Flow" thrust bearing surface of the prior art. FIG. 1A is a top view of a conventional stationary member. FIG. 1B is a cross section along line 1B-1B of a conventional stationary member. FIG. 1C is a perspective view of a conventional rotating member. In conventional assemblies, the rotating member of FIG. 1C is keyed to the shaft of a submersible pump and rotates with the shaft as fluid is pumped to the surface of a well. The stationary member of FIGS. 1A, 1B is attached to the wall of the diffuser of the submersible pump and does not rotate. Conventional designs are not well suited to withstand excessive abrasion in pumping systems or to keep the bearing surfaces cool. These shortcomings decrease the longevity of the pump components.

Therefore, there is a need for better abrasion resistance in well fluid wetted assemblies to more readily withstand the effects of well-born solids and improve cooling characteristics, thereby improving the lifespan of the pump and pump components in submersible pump applications.

BRIEF SUMMARY OF THE INVENTION

One or more embodiments of the invention enable abrasion resistance in well fluid wetted assemblies.

Enhanced abrasion resistance in well fluid wetted assemblies is described. The bearing set of the invention may comprise a stationary member, wherein the stationary member further comprises a radial flute, sector flute and an axial flute, and wherein the radial flute and sector flute intersect with the axial flute; and a rotating member, wherein the rotating member is rotationally coupled with the stationary member, wherein the rotating member further comprises a thrust surface groove and a radial surface groove, and wherein the thrust surface groove intersects with the radial surface groove. In some embodiments, the stationary member comprises at least two radial flutes, wherein the radial flutes create at least two sectors and at least two sector flutes on the radial surface of the stationary member. In certain embodiments, the radial surface groove is a spiral groove. In some embodiments the stationary member of the invention may be combined with a conventional rotating member of the prior art. In other embodiments, the rotating member of the invention may be combined with a conventional stationary member of the prior art.

A bearing for a submersible pump system comprises a radial flute and an axial flute, wherein the radial flute intersects with the axial flute.

The method of the invention may comprise a method of enhancing abrasion resistance of submersible assemblies, the method comprising pumping a hydrocarbon laden fluid from an underground formation to a surface location, wherein a pump component comprises a radial groove and an axial groove on a bearing surface, and wherein the radial groove and the axial groove intersect. In some embodiments, the pump component is the rotating member of a bearing set. In certain embodiments, the pump component is the stationary member of a bearing set. In some embodiments the pump component further comprises a submersible pump. In other embodiments, the pump component further comprises a submersible intake.

The bearing surface(s) of the invention may be suitable for a variety of types of submersible stages known in the art for use in submersible pumps. For example, mixed flow submersible pump stages, as well as radial flow submersible pump stages, may make use of the enhanced bearing surface(s) of the invention. Both these and other submersible stages suitable for use with an ESP system may benefit from the enhanced bearings and method of the invention.

In further embodiments, features from specific embodiments may be combined with features from other embodiments. For example, features from one embodiment may be combined with features from any of the other embodiments.

In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein.

Figure 1A:
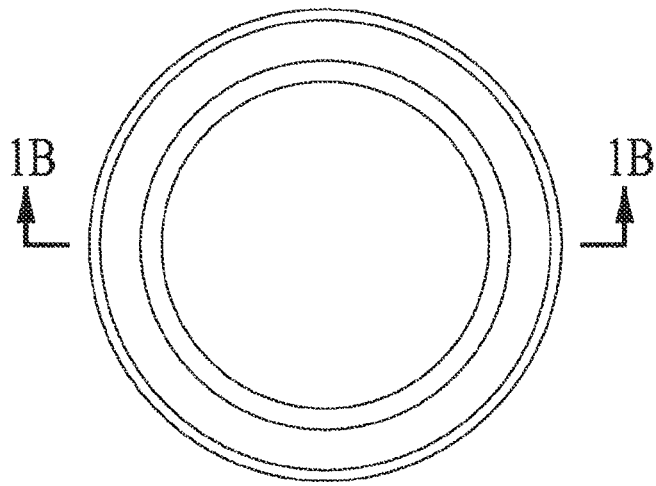
FIG. 1A illustrates a top view of a conventional stationary bearing surface of the prior art.
Figure 1B:
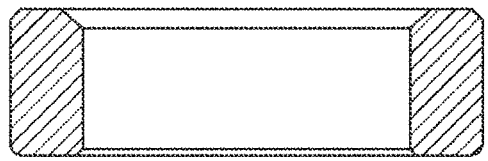
FIG. 1B illustrates a cross sectional view along line 1B-1B of FIG. 1A of a conventional stationary bearing surface of the prior art.
Figure 1C:
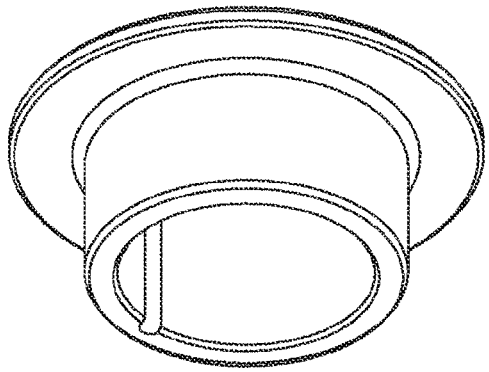
FIG. 1C illustrates a perspective view of a conventional rotating member of the prior art.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Enhanced abrasion resistance for well fluid wetted assemblies will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to an axial flute includes one or more axial flutes.

"Coupled" refers to either a direct connection or an indirect connection (e.g., at least one intervening connection) between one or more objects or components. The phrase "directly attached" means a direct connection between objects or components.

One or more embodiments of the invention provide enhanced abrasion resistance for well fluid wetted assemblies for use in electric submersible pump applications. While the invention is described in terms of an oil or gas production embodiment, nothing herein is intended to limit the invention to that embodiment.

The invention disclosed herein assists the flow of both fluids and solids through well fluid wetted assemblies by creating channels, such as flutes, sectors and/or grooves, in the radial and/or thrust support surfaces. In some embodiments, the flutes, sectors and/or grooves, such as axial flutes 205 (shown in FIG. 2B), radial flutes 215 (shown in FIGS. 2A, 2B), sector flutes 225 (shown in FIGS. 2A, 2B), surface groove 305 (shown in FIG. 3) and/or thrust surface groove 310 (shown in FIG. 3), and the intersections of those flutes and grooves disclosed herein break up the surface area of the bearing surfaces and create paths for solids and fluids to traverse the length of the bearing surfaces. In certain embodiments, the flutes or grooves reduce the body wear in the bearing surfaces by decreasing solids production and reducing the heat in the bearings that would otherwise degrade the bearing surfaces and ultimately cause failure. Sectors, such as sectors 220 (shown in FIG. 2A), may allow both fluids and solids the opportunity to exit across thrust surfaces during operation of the assembly, thereby allowing the assembly to run cooler. The improved flow characteristics may enhance cooling and the movement of materials in or through the bearing areas. This reduces wear on the bearings, thereby increasing the service life of the ESP pump and system or other assembly employing the invention. Furthermore, the invention disclosed herein may allow a higher surface load than the same component that does not employ the apparatus, system or method of the invention.

Figure 2A:
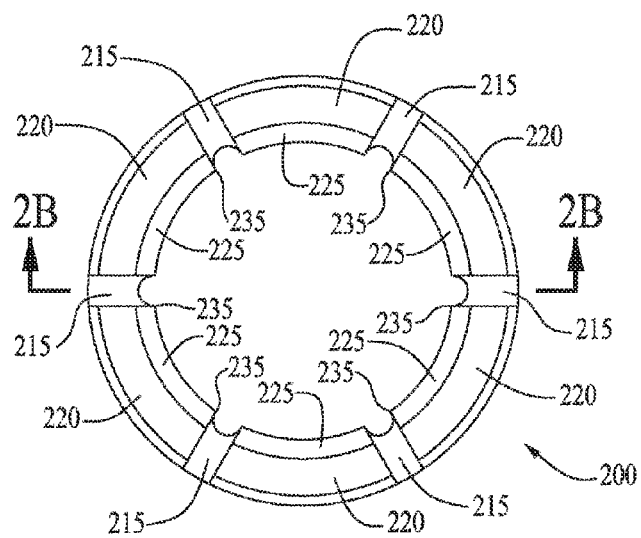
FIG. 2A illustrates a top view of an exemplary stationary bearing surface of the invention.
Figure 2B:
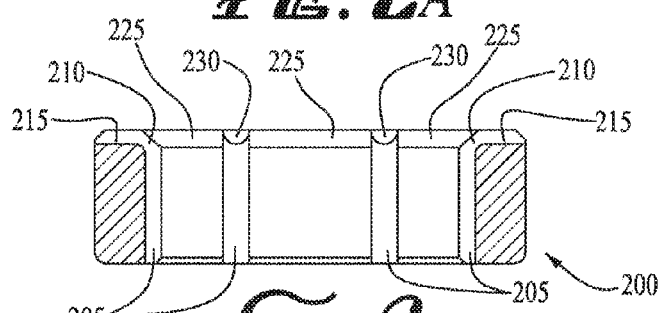
FIG. 2B illustrates a cross sectional view along line 2B-2B of FIG. 2A of an exemplary stationary bearing surface of the invention.

The invention comprises enhanced abrasion resistant components for electric submersible pump (ESP) systems. FIG. 2A illustrates a top view of an exemplary stationary bearing surface (stationary member) of the invention. FIG. 2B illustrates a cross section view of an exemplary stationary member of the invention. Stationary member 200 may include axial flutes 205 along the axial surface of stationary member 200, radial flutes 215 along the thrust bearing surface of stationary member 200, and/or sectors 220 and sector flutes 225 around the circumference of stationary member 200. In some embodiments, axial flutes 205, radial flutes 215 and/or sector flutes 225 may intersect. Axial flutes 205 may intersect with sector flutes 225 at intersection 210. Axial flutes 205 may intersect with radial flutes 215 at connection 230. Radial flutes 215 may intersect with sector flutes 225 at junction 235. In some embodiments one or more intersections 210, connections 230 and/or junctions 235 may be the same location such that axial flutes 205, radial flutes 215 and sector flutes 225 intersect with one another. In certain embodiments intersections 210, connections 230 and/or junctions 235 are distinct locations.

Figure 3:
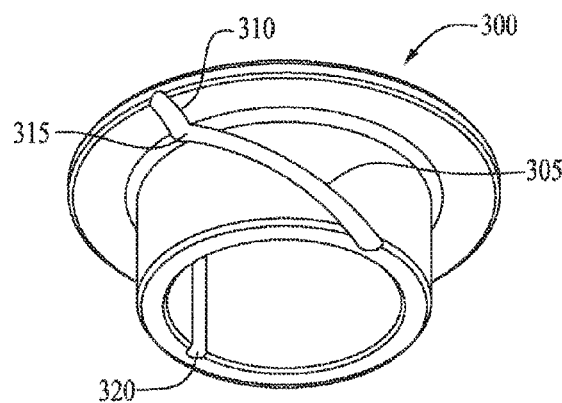
FIG. 3 illustrates a perspective view of an exemplary rotating bearing surface of the invention.

FIG. 3 illustrates a perspective view of an exemplary rotating bearing surface of the invention. Rotating member 300 may include key groove 320, radial surface groove 305 and/or thrust surface groove 310. Radial surface groove 305 intersects thrust surface groove 310 at cross 315. In some embodiments, rotating member 300 may include an axial surface groove and/or axial flute in addition to or in place of radial surface groove 305.

The number, shape, width and depth of radial flutes 215, axial flutes 205, sector flutes 225, radial surface grooves 305 and thrust surface grooves 310 may vary based on desired service, the type of solids encountered during fluid movement through or on the bearing surface and the surface area, size and/or shape of the bearing surfaces. For example, the flutes and grooves may be straight, angled, slanted, spiral shaped, curved, shallow, deep, wide or narrow. In certain embodiments, the grooves and/or flutes may have a maximum depth of about 0.070 inches and a maximum width of about 0.100 inches. In other embodiments, shallower or deeper grooves and/or flutes may be desirable.

In the embodiment shown in FIGS. 2A, 2B, six axial flutes 205 intersect with six radial flutes 215 and six sector flutes 225 on stationary member 200. In some embodiments, only one axial flute 205, one radial flute 215 and/or one sector flute 225 may be necessary. In some embodiments, sector flute 225 may not be necessary. In certain embodiments, three radial flutes 215 may intersect with three sector flutes 225 and/or three axial flutes 205. In some embodiments, six axial flutes 205 and four radial flutes 215 may be present. The number, type and combination of flutes may vary based on desired service, the type of solids encountered during fluid movement through or on the bearing surface and the surface area, size and/or shape of the bearing surfaces. The number of sectors 220 and sector flutes 225 may be dictated by the thrust loading and the quantity of radial flutes 215 on the radial bearing surface. The shape of sector 220 may be based on desired flow characteristics of the fluids and solids flowing through or over the bearing surface.

In the embodiment shown in FIG. 3, radial surface groove 305 is a left handed spiral groove that intersects with one thrust surface groove 310. In some embodiments radial surface groove 305 may be a right handed spiral groove. In certain embodiments radial surface groove 305 may be a straight axial flute. More or less flutes and grooves are also contemplated.

In some embodiments, the bearing surface and/or abrasion resistant pump components may be at least as hard as the abrasive solids found in the laden well fluids. For example, the bearing surface may be tungsten carbide, silicon carbide, titanium carbide, or other materials having similar properties. Ceramic as well as other manmade compounds, or steel alloys having special surface coatings to increase surface hardness may also be used. Examples of suitable coatings may include nickel boride, plasma type coatings or surface plating like chrome or nickel. Diffusion alloy type coatings may also be suitable.

In some embodiments, the bearing surface and other abrasion resistant components may be manufactured through a casting process. Flutes, sectors or grooves may be applied during the casting process and then finish ground. In certain embodiments, some or all of the flutes or grooves may be ground in place as part of the finishing process. Electrical discharge machining (EDM), such as wire EDM or sinker EDM may also be used to add grooves, flutes and/or sectors to the bearing surface when great precision is desirable. Wire EDM may be used when the semi-finished part has a hole through it, for example the fluted grooves in the bore of a bushing. Sinker EDM may be used to create a spiral groove or other intricate shape. The various methods of manufacturing are well known to those of skill in the art and may depend upon factors such as the particular function, shape or size of the bearing surface, flutes, sectors and/or grooves.

In certain embodiments rotating member 300 may be used with stationary member 200 in the same bearing set. In some embodiments rotating member 300 may be combined with a conventional stationary member of the prior art. In some embodiments stationary member 200 may be combined with a conventional rotating member of the prior art. In further embodiments, the flutes, grooves and intersections of the invention may be employed on other submersible components such as submersible intakes or gas separators and other submersible and non-submersible assemblies for thrust handling or radial support.

A method of enhancing the abrasion resistance of submersible assemblies comprises pumping a hydrocarbon laden fluid from an underground formation to a surface location. The pump components may comprise the flutes, grooves and intersections (intersections, connections, junctions, crosses) of the invention. For example, the rotating and/or stationary members of a bearing set in a diffuser of a submersible pump may employ one or more of the flutes, grooves and intersections described herein. In some embodiments components of a submersible intake or gas separator may employ one or more flutes, grooves, sectors and intersections of the invention.

Figure 4:
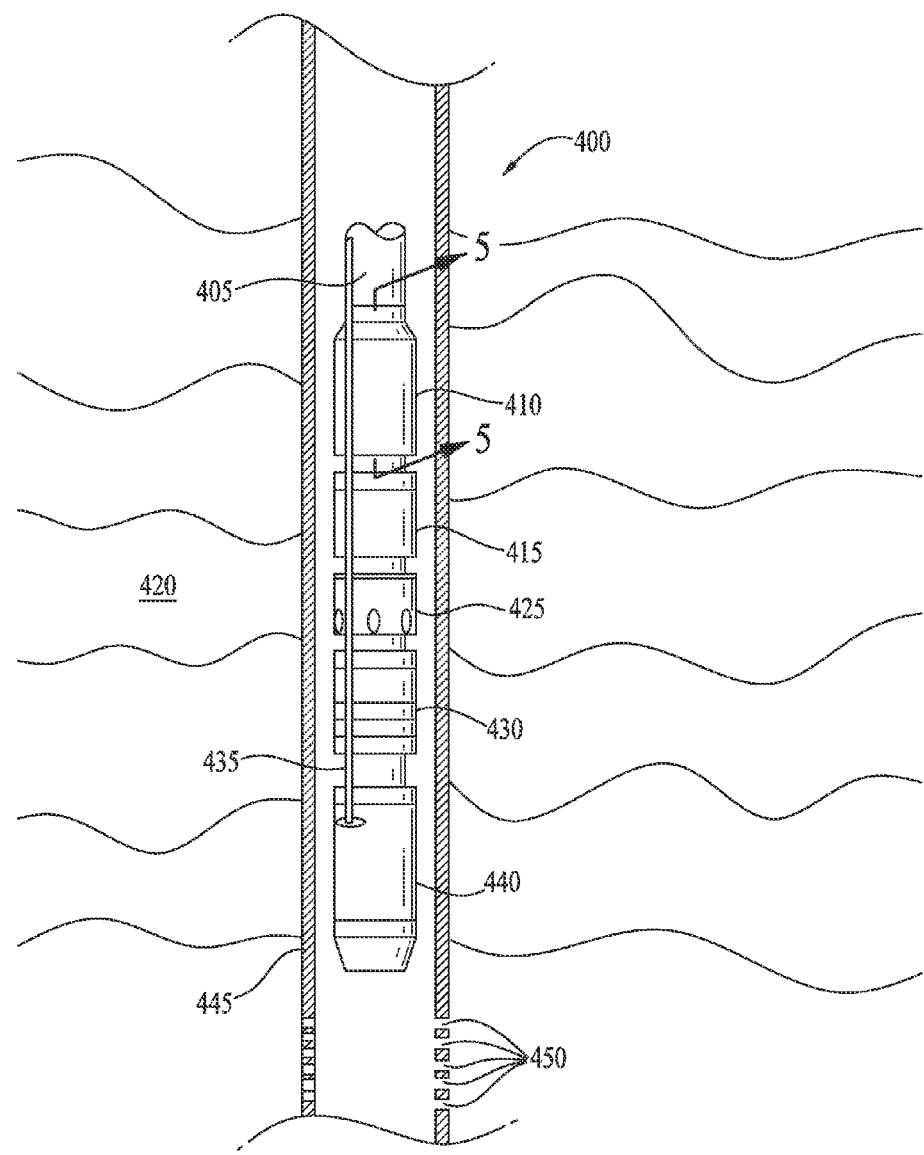
FIG. 4 illustrates one embodiment of an exemplary electric submersible pump (ESP) system for use in the system of the invention.
Figure 5:
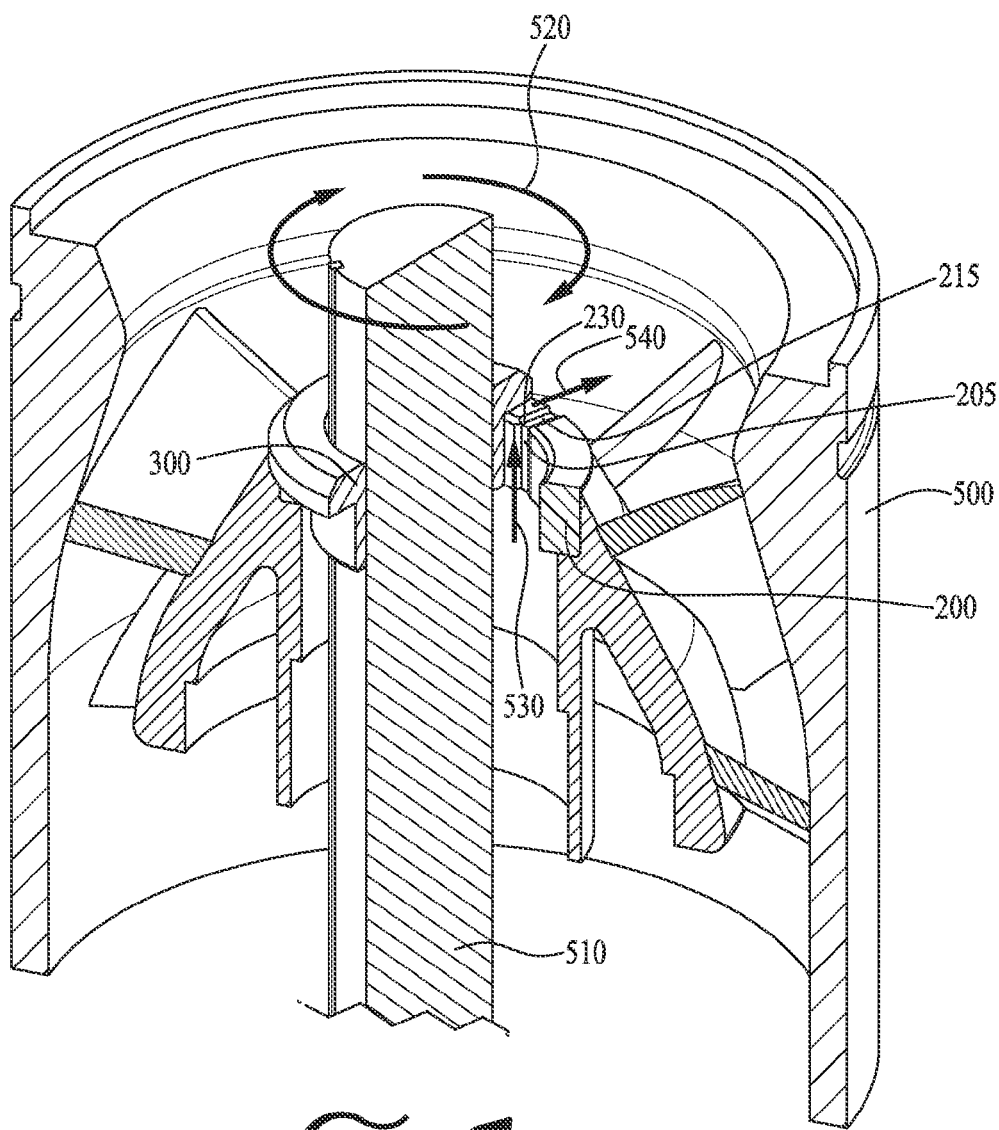
FIG. 5 illustrates a cross-sectional view along line 5-5 of FIG. 4 of one embodiment of a diffuser of a submersible pump for use in the system of the invention.

FIG. 5 illustrates an enlarged cross section of one embodiment of a diffuser for use in the system of the invention. In some embodiments, diffuser 500 may be a diffuser of an electric submersible pump, such as ESP pump 410 (shown in FIG. 4). Stationary member 200 may be pressed into or attached to the wall of diffuser 500 and may remain stationary during operation of ESP pump 410. Rotating member 300 may be keyed to shaft 510 and may rotate with shaft 510 when ESP pump 410 is in operation. As shown in FIG. 5, stationary member 200 includes axial flute 205 and radial flute 215. When diffuser 500 is in operation and the shaft rotates in clockwise direction 520, pumped fluid and solids may be guided in axial direction 530 through axial flute 205 and radial direction 540 through radial flute 215, which may improve fluid and solid flow through the pump components. In FIG. 5, axial flute 205 and radial flute 215 intersect at connection 230. As shown in FIG. 5, axial flute 205 and radial flute 215 may reduce the body wear in stationary member 200 and/or rotating member 300 by decreasing solids production and reducing the heat that would otherwise degrade the bearing surfaces and ultimately cause failure. In some embodiments, additional flutes, grooves and/or sectors and the corresponding intersections, junctions, connections and/or crosses as described herein may be included to further improve fluid and solid flow through pump components. In certain embodiments, only one of axial flute 205 and/or radial flute 215 is necessary.

FIG. 4 depicts an exemplary ESP system arranged to pump natural gas or oil from a well formation and making use of the enhanced abrasion resistance of the invention. As illustrated, the system further comprises well bore casing 445 with casing perforations 450, an ESP motor 440, motor lead extension 435, ESP seal 430, ESP intake 425, ESP charge pump 415, an ESP pump 410 and production tubing 405. One or more of these system components may make use of the enhanced abrasion resistance of the invention. In some embodiments, the bearings of FIGS. 2 and/or 3 and/or the flutes, grooves and/or sectors of the invention may be employed in ESP pump 410 and/or ESP intake 425.

The bearing surface of the invention may be suitable for a variety of types of submersible stages known in the art for use in submersible pumps. For example, mixed flow submersible pump stages, as well as radial flow submersible pump stages, may make use of the enhanced bearing surface of the invention. Both these and other submersible stages suitable for use with an ESP system may benefit from the enhanced bearings and method of the invention.

While the invention herein disclosed has been described by means of specific embodiments and applications thereof, numerous modifications and variations could be made thereto by those skilled in the art without departing from the scope of the invention set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. A bearing set for a submersible pump system, the bearing set comprising:
   a stationary member, wherein the stationary member comprises a sector flute; and
   a rotating member, wherein the rotating member is rotationally coupled with the stationary member, wherein the rotating member further comprises a thrust surface groove and a radial surface groove, and wherein the thrust surface groove intersects with the radial surface groove.

2. The bearing set of claim 1, wherein the stationary member further comprises a radial flute and an axial flute, and wherein the radial flute and axial flute intersect with the sector flute.

3. The bearing set of claim 2, further comprising at least two radial flutes, wherein the radial flutes create at least two sectors on the radial surface of the stationary member.

4. The bearing set of claim 2, wherein the stationary member comprises three radial flutes, three axial flutes and three sector flutes.

5. The bearing set of claim 2, wherein the stationary member comprises six radial flutes, six axial flutes and six sector flutes.

6. The bearing set of claim 1, wherein the radial surface groove is a spiral groove.

7. A bearing for a submersible pump, the bearing comprising:
   a stationary member, the stationary member comprising a radial flute, a sector flute and an axial flute, wherein the radial flute intersects with the axial flute, and wherein the sector flute intersects with the radial flute and the axial flute; and
   a rotating member rotationally coupled with the stationary member, wherein the rotating member further comprises a thrust surface groove and a radial surface groove, and wherein the thrust surface groove intersects with the radial surface groove.

8. A system for enhancing the abrasion resistance of submersible assemblies, the system comprising:
   a submersible pump, the submersible pump further comprising:
      a bearing set, wherein the bearing set comprises a stationary member and a rotating member, wherein the stationary member comprises an axial flute and a radial flute, and wherein the axial flute and radial flute intersect; and
   a fluid hydrocarbon, wherein the fluid hydrocarbon further comprises a solid, wherein the fluid hydrocarbon flows through the bearing set, and wherein the flutes are configured to reduce abrasion on the bearing set.

9. The system of claim 8, wherein the stationary member further comprises a sector flute, and wherein the sector flute intersects with the axial flute and radial flute.

10. A method of enhancing the abrasion resistance of submersible assemblies, the method comprising:
    Pumping a fluid from an underground formation to a surface location, wherein a pump assembly component comprises a radial surface groove and a thrust surface groove, and wherein the radial surface groove and thrust surface groove intersect.

11. The method of claim 10, wherein the fluid is a hydrocarbon laden fluid.

12. The method of claim 10, wherein the pump assembly component is the rotating member of a bearing set.

13. The method of claim 10, wherein the pump assembly component further comprises an ESP pump.

14. The method of claim 10, wherein the pump assembly component further comprises an ESP intake.

* * * * *